(12) United States Patent
Soll et al.

(10) Patent No.: US 6,185,865 B1
(45) Date of Patent: *Feb. 13, 2001

(54) METHOD FOR CLEARING OF FUNGAL SPORES FROM SEED BY ULTRASOUND

(75) Inventors: David R. Soll; Karla J. Daniels, both of Iowa City, IA (US)

(73) Assignee: University of Iowa Research Foundation, Iowa City, IA (US)

( * ) Notice: Under 35 U.S.C. 154(b), the term of this patent shall be extended for 0 days.

This patent is subject to a terminal disclaimer.

(21) Appl. No.: 09/013,719

(22) Filed: Jan. 26, 1998

(51) Int. Cl.[7] .................................................. A01C 1/00
(52) U.S. Cl. ........................... 47/61; 47/58.1; 47/DIG. 12
(58) Field of Search ...................... 47/61, 58.1, DIG. 12, 47/DIG. 16

(56) References Cited

U.S. PATENT DOCUMENTS

| | | |
|---|---|---|
| 3,307,289 | 3/1967 | Lemm . |
| 3,499,436 | 3/1970 | Balmuth . |
| 3,703,051 * | 11/1972 | Weinberger .............................. 47/58 |
| 3,902,273 | 9/1975 | Friedman . |
| 4,055,915 * | 11/1977 | Charnoe .................................. 47/58 |
| 4,065,875 | 1/1978 | Srna . |
| 4,173,651 | 11/1979 | Muramoto et al. . |
| 4,211,744 | 7/1980 | Boucher . |
| 4,292,322 | 9/1981 | Muramoto et al. . |
| 4,671,254 | 6/1987 | Fair . |
| 4,680,889 * | 7/1987 | Carlson .................................. 47/58 |
| 4,834,789 | 5/1989 | Carlson . |
| 5,003,965 | 4/1991 | Talish et al. . |
| 5,048,520 | 9/1991 | Vago . |
| 5,065,761 | 11/1991 | Pell . |
| 5,143,063 | 9/1992 | Fellner . |
| 5,158,070 | 10/1992 | Dory . |
| 5,209,221 | 5/1993 | Riedlinger . |
| 5,219,401 | 6/1993 | Cathignol et al. . |
| 5,271,470 | 12/1993 | King et al. . |
| 5,295,484 | 3/1994 | Marcus et al. . |
| 5,380,411 | 1/1995 | Schlief . |
| 5,383,459 | 1/1995 | Iwama et al. . |
| 5,431,621 | 7/1995 | Dory . |
| 5,498,431 * | 3/1996 | Linder .................................. 426/238 |
| 5,731,265 | 3/1998 | Hou et al. . |
| 5,950,362 * | 9/1999 | Shors et al. .............................. 47/61 |

FOREIGN PATENT DOCUMENTS

1440379 * 11/1988 (SU) .

OTHER PUBLICATIONS

Alan E. Crawford, The Application of High Intensity Sound For The Stimulation of Plant Growth, Proceedings of The Institute of Acoustics, Aug. 1, 1989, 81–88, Springer–Verlag, Berkshire.

Weinberger, P., Anderson, P., and Donnovan, L.C., Changes in Production, Yield, and Chemical Composition of Corn (Zes Mays) After Ultrasound Treatment of the Seeds, 1979, 81–88, No. 16., Springer–Verlag, Berkshire.

I.D. Rubtsova, Effect of Ultrasound on the Germination of the Seeds and on Productivity of Fodder Beans, Sep. 27, 1965, 560–564, Biofizika 12: No. 3, Tambov Pedagogical Institute.

Kovics–Tartar and Nagy, Novenytermeles 33(2): 125–138, Jan. 1, 1984.*

* cited by examiner

*Primary Examiner*—Michael J. Carone
*Assistant Examiner*—Jeffrey L. Gellner
(74) *Attorney, Agent, or Firm*—Daniel A. Rosenberg; Kent A. Herink; Davis, Brown Law Firm

(57) ABSTRACT

A method of clearing fungal spores from seed by immersing the seed in an aqueous solution including dissolved inert gas and sonicating the seed at a frequency preferably of between about 15 kHz and about 30 kHz and an energy density of between about 1 watt/cm$^2$ and about 10 watts/cm$^2$ for a period of between 0.1 minute and about 15 minutes.

4 Claims, 2 Drawing Sheets

METHOD FOR CLEARING OF FUNGAL SPORES FROM SEED BY ULTRASOUND

BACKGROUND OF THE INVENTION

1. Field of the Invention

The invention relates generally to a method for clearing fungal spores from seed and, more specifically, to a method of treating seeds with sound waves to clear fungal spores from seed.

2. Background of the Prior Art

Disease pathogens are a major cause of great financial loss for plant production. Fungal contamination at germination, plant growth, ear maturation, and storage results in large yield loss for the producer. Fungi will cause seeds to fail to germinate, create diseased plants, and create plants that fail to yield as much. Fungi, which flourish during the growth season, can limit the market availability of an entire producer's crop. In some cases, fungal contamination makes the crop worthless as food for humans or animals (e.g., *Aspergillus* sp. and *Fusarium* sp. with corn). In the USDA publication, Biologic and Economic Assessment of Pesticide Use on Corn and Soybeans, an expert estimated the economic impact of fungicides to corn farmers alone at almost $1.5 billion as a result of yield loss that would occur in the absence of fungicides.

To inhibit fungal growth on stored seed and during germination, seeds are soaked in an anti-fungal agent, a poison, which renders the seed no longer available as a food stuff for humans or animals. In addition, this poison enters the environment. Additional methods which are used for decreased fungi loss are use of microbes, strict adherence to planting conditions, and genetic manipulation in addition to chemical means.

The problem is to eliminate or decrease fungal growth without adding toxins to the environment. Some plant hybrids are resistant to fungal growth, but selection for them has a performance cost and it is likely only a matter of time until fungal strains will develop that will overcome the plant resistance.

SUMMARY OF THE INVENTION

The invention consists of methods for clearing fungal spores from seeds. Seed to be treated is immersed in water and exposed to sound energy at frequencies between 15 kHz and 30 kHz for periods between about 0.1 and 15 minutes. The ultrasonic energy generates cavitational forces by the adiabatic collapse of micro-bubbles in the liquid medium, particularly those bubbles that collapse at the surface of the seed. The effect is substantially enhanced by saturating the water with a noble gas such as helium or argon, or combinations of inert gases.

Corn seed treated by this method has been found to have only one species of fungus remaining (*Penicillium* sp.) and have a decrease of 90% of fungal growth over controls.

A purpose of the invention is the treatment of seeds clear fungal spores from seeds to preserve a higher percentage of seeds to retain food use and allow germination which improves yield or improves quality of seed which improves yield.

These and other objects of the invention will be made clear to a person of ordinary skill in the art upon a reading and understanding of this specification, the associated drawings, and appended claims.

DETAILED DESCRIPTION OF THE INVENTION

A. Definition

Figure 1:
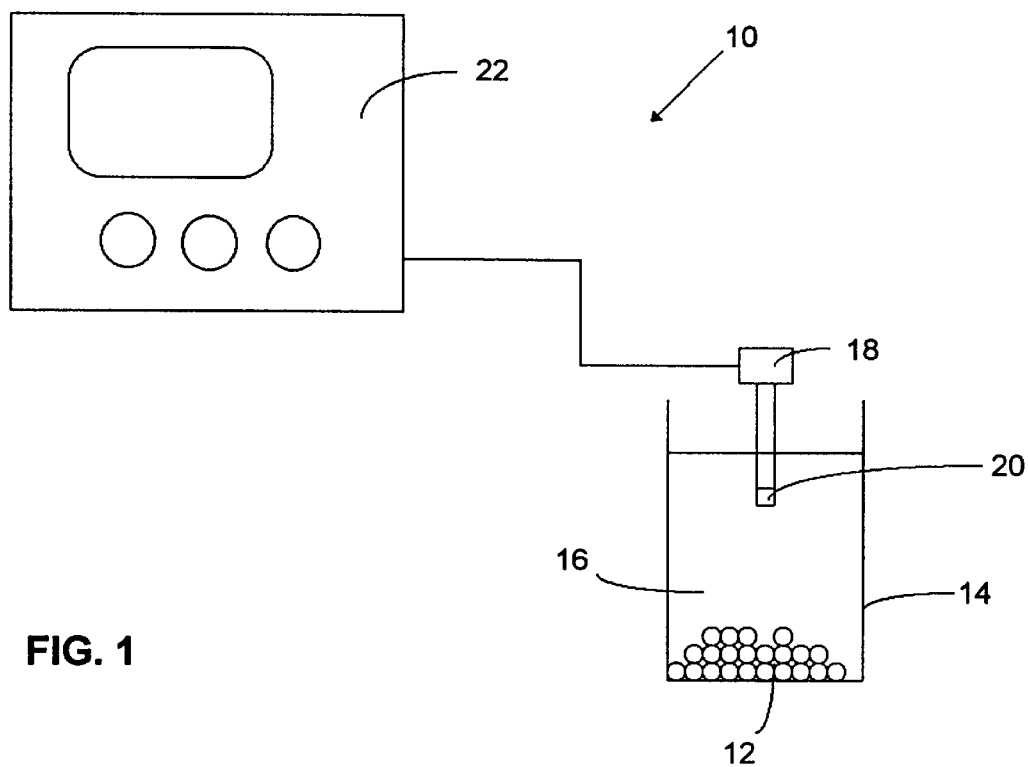
FIG. 1 is a diagrammatic view of the apparatus for practicing the present invention.

In describing the present invention, the following term will be employed, and is intended to be defined as indicated below.

Clearing, as used throughout the specification and claims, includes removal or killing or other method of inactivation of fungal spores found on plant seeds by the method described in this disclosure.

B. Method

A new method of enhancing the clearing fungal spores from seeds has been found. The method is particularly helpful in decreasing the amount of seed which is lost to fungal destruction or seed which is decreased in quality and yield.

The method considerably reduces the fungal spores on seeds, including important agricultural seeds such as corn and soybean, by the sonification of such seeds in a liquid medium, preferably water. The sonification is by the application of sound waves at ultrasonic frequencies from between about 15,000 and 100,000 Hz, and preferably between about 20,000 Hz and 30,000 Hz, with an optimum near 20,000 Hz.

Ultrasonic energy is applied to the liquid and seed mixture by a sound transducer immersed in the liquid medium. While not wishing to be bound by any particular theory as to the mechanism of the subject invention, it is currently believed that the acoustic energy is carried through the liquid by oscillations of the liquid molecules in the direction of propagation. This produces alternating adiabatic compressions and decompressions together with corresponding increases and decreases in pressure and temperature. If the periodic decreases of pressure in the liquid are sufficiently high during the negative pressure phase, the cohesive forces of the liquid may be exceeded, at which point small cavities are formed by the process of cavitation. These small cavities then rapidly collapse, producing a very large amplitude shock wave with local temperatures up to a few hundred degrees centigrade or more. The collapse of the cavities are also known to create electrical discharges upon their collapse, giving rise to the effect known as sonoluminescence.

The effects of cavitation are greatly enhanced through the introduction of a variety of gases into the liquid. For example, degassed distilled water requires an energy density level of approximately 1 to 10 watts/cm$^2$ before cavitation occurs. By saturating the water with a noble gas, such as one or more of the inert gases helium, neon, argon, krypton, xenon, or radon, cavitation effects are seen at much lower energy density levels and the effects at energy density levels on the order of 1 to 10 watts/cm$^2$ are greatly enhanced. This effect is believed to be due to the creation of micro-bubbles which more easily form the small cavities upon the application of sonic energy. Additionally, the cavities in the presence of the saturated gas are believed to generate shock waves of larger amplitude upon collapse of the cavities than are achieved with degassed water.

Seeds treated using the apparatus of the present invention wherein degassed distilled water was used as the liquid medium did not exhibit enhanced clearing effects. Previous experiments with ultrasound to speed seed germination showed variation in results from experiment to experiment when tap water was used. On the other hand, when tap water was saturated with argon gas, very surprising and dramatic germination effects were observed and such effects were reproducible from experiment to experiment. Other experiments in which the saturating gas was nitrogen also exhibited enhanced clearing effects, but not nearly as pronounced as with argon. Effects similar to that with argon-saturated water were obtained with helium-saturated water, suggesting that other inert gases facilitate the process, therefore gas-saturated water was used in the fungal clearing experiments as well.

The present method is carried out using an ultrasonic frequency generator for driving a piezoceramic sonicator or magnetostrictive sonicator (sold under the brand name Terfenol by Etrema Products, Inc., of Ames, Iowa), the horn of which is immersed in the liquid surrounding the seeds. After sonication, the seeds are dried, and then placed on YPD agar (1% yeast extract, 2% peptone, 2% dextrose, 2% agar) plates, to induce fungal growth. Parameters which have been monitored in different experiments have included temperature and treatment time, frequency and amplitude of the ultrasound waves, and the presence or absence of a noble gas. The seeds tested were first generation ($F_1$) hybrid seed corn, sweet corn seed, and soybean seed.

Apparatus

The apparatus used in the treatment of seeds according to the present invention is illustrated diagrammatically in FIG. 1, generally at 10. Seeds 12 are placed in a container 14 and covered with a liquid medium 16. A sound transducer 18 is suspended with the horn 20 of the transducer immersed in the liquid medium 16. The transducer is connected to an ultrasonic frequency generator 22. In the preferred embodiment, the sound transducer 18 is a piezoceramic transducer, Model VCX600 obtained commercially from Sonics and Materials Inc., Danbury, Conn. Alternative transducers may be used. Magnetostrictive transducers are capable of delivering higher levels of sound energy to the liquid media and may be preferably used if higher sound densities are desired, for example if large quantities of seed are to be sonicated. The frequency generator 22 is a Model 33120A obtained commercially from Hewlett Packard and is matched to the transducer 18. It has a frequency range of between 15 kHz and 30 kHz and can supply between zero and 500 watts to the sound transducer 18. In the experiments described herein, the power densities were between 30 watts per $cm^2$ and 80 watts per $cm^2$, although given the rated efficiency of the sound transducer 18, higher power densities can be achieved in the container 14.

Initial Experiments

In the initial experiments to observe the effects of ultrasonification on seed germination, there were indications that the level of fungal contamination was reduced by treatment. In these initial experiments, seeds were sonicated in tap water at 22° C. using the piezoceramic sonicator with the wave generator set at 20 kHz. A reduction of fungal contamination was suggested in three of the five initial experiments. Since the sonification and soaking of seeds was randomized in the course of each experiment, the results of the three positive experiments suggested that conditions may be changed to optimize the effect. Time of sonification was demonstrated to increase the reduction of fungal contamination observed on seeds, but data continued to be variable.

Addition of nitrogen gas

It was hypothesized in the corn germination experiments that variability was due to the purity and the gas content of the water. It was observed that deionized water sometimes resulted in the smallest effects on fungal clearing. Impurities in the water and, more importantly, dissolved gases act as micro-nuclei upon which cavitation bubbles may form. The experiments were repeated as above; however, degassed, deionized water was used in the control and nitrogen-saturated deionized water was used for sonifications. An enhancement of fungal clearing are observed in the latter samples.

Addition of noble gases

In the early 1930s, Frenzel and Schultes observed that photographic plates became exposed or "fogged" when submerged in water exposed to high frequency sound. This observation was the first recorded for the emission of light by acoustic waves or "sonoluminescence." The physics of the phenomenon are not well understood. Dr. Seth Puttnam has demonstrated that the saturation level and type of gas in the water has an effect on the light emission. Nitrogen gas gives a modest light emission, but the noble gases, such as argon, will increase the light emission by orders of magnitude. The reason for this effect is not understood.

Since sonoluminescence is thought to be the result of cavitational forces, an experiment was undertaken to test whether the presence of argon gas in the water surrounding a seed would have a positive effect on germination. The level of fungal contamination of seeds sonicated in the presence of deionized water saturated with argon exhibited a dramatic decrease determined by incubating control and treated seeds on a rich nutrient agar at 22° C. In one set of experiments, a control corn panel and a sonicated corn panel were set up and observed over a 5-day period.

Individual kernels of the publicly available hybrid seed corn variety Pioneer® 3394 were sonicated in 5 ml of water saturated with argon gas. The kernels were submerged for 10 minutes in a polypropylene 12 ml test tube prior to using the sound transducer (Model VCX600)operating at 40% amplitude, a converter (Model CV-26), a probe (TI-6AL-4V), and a tapered 3 mm tapered microtip (Part No. 630-018) 18, all available from Sonics and Materials, Inc., Danbury, Conn. Argon-saturated water was prepared by bubbling pure argon gas through 500 ml of tap water in a side-armed flask at room temperature for a minimum of 20 min. Tap water was sterilized before it was gassed by ultrafiltration through a 0.22 $\mu$m cellulose acetate membrane (Corning Glass Works, Corning, N.Y.). All glassware or laboratory plastic was sterilized by autoclaving in the former case or by the manufacturer in the latter case. To eliminate a rise in temperature due to the thermal effects of sonication, the 15 ml polypropylene tube was placed in an ice bath during treatment. Temperatures did not exceed 20° C.

In a second set of experiments, individual kernels of the publicly available hybrid seed corn variety Pioneer® 3394 were sonicated in 5 ml of water saturated with helium gas. The kernels were submerged for 10 minutes in a polypropylene 12 ml test tube using the sound transducer sound transducer (Model VCX600)operating at 40% amplitude, a converter (Model CV-26), a probe (TI-6AL-4V), and a tapered 3 mm tapered microtip (Part No. 630-018). Helium-saturated water was prepared by bubbling pure helium gas through 500 ml of tap water in a side-armed flask at room temperature for a minimum of 20 min. Temperature of the kernel and water in the container was maintained at 15° C. by a water bath. The flask was then sealed and 5 ml aliquots were used for sonification of the kernels. The frequency generator and sound transducer were tuned to 20 kHz initially and after each kernel was treated and a fresh aliquot of helium-saturated water was used for sonification of each kernel. Control seed was immersed in helium-saturated water also for 10 minutes at 15° C., but not sonicated.

EXAMPLE 1

Sonication of a Corn Hybrid

Figure 2:
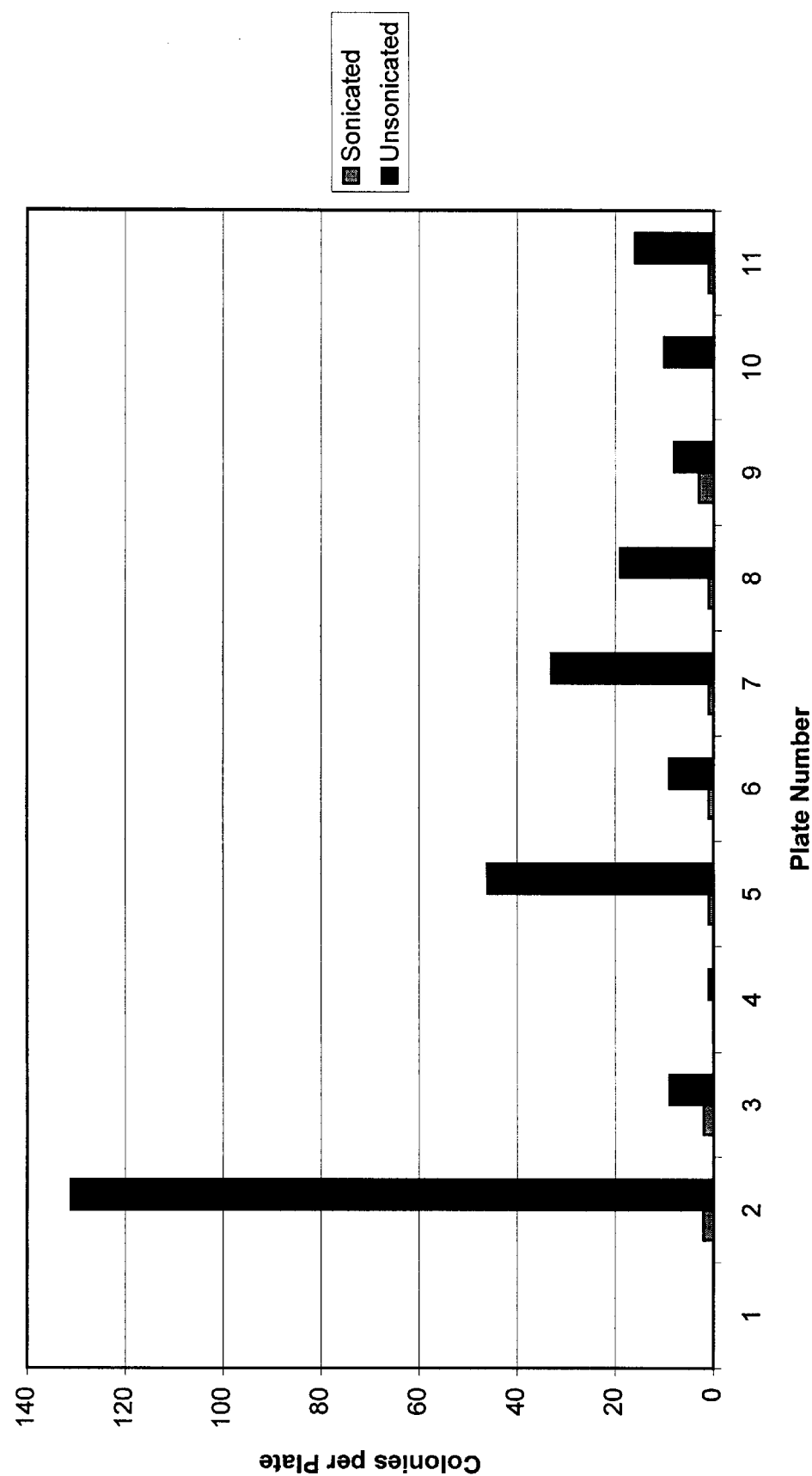
FIG. 2 is a histogram showing the difference in fungal growth for treated and untreated seeds.

A test for fungus growth in sonicated corn hybrid Pioneer® 3394 was performed. Sonicated corn and unsonicated (control) corn were placed on YPD agar plates to test for fungus growth. The corn was sonicated at 40% amplitude for 10 minutes with 20 seeds per run in 20 mL of water saturated with argon using a 2" sonicator probe on ice. The control seeds were soaked for 10 minutes in water saturated with argon. The results are shown below in Table 1. A histogram of the results in shown in FIG. 2. Pictures of the plates are shown in FIGS. 3 and 4.

TABLE 1

Fungus Growth with Corn Hybrid #3394

| Plate | Colonies per Plate | |
| --- | --- | --- |
| | Sonicated | Unsonicated |
| 1 | No data | No data |
| 2 | 2 | 131 |
| 3 | 2 | 9 |
| 4 | 0 | 1 |
| 5 | 1 | 46 |
| 6 | 1 | 9 |
| 7 | 1 | 33 |
| 8 | 1 | 19 |
| 9 | 3 | 8 |
| 10 | 0 | 10 |
| 11 | 1 | 16 |
| Mean | 1.2 | 28.2 |
| Standard Deviation | 0.9 | 38.5 |

EXAMPLE 2

Sonication of Soybean

A test for fungus growth in sonicated soybean seeds was performed. Sonicated soybean and unsonicated (control) seeds were placed on water-saturated filter paper to test for fungus growth. The seed was sonicated at 20 kHz for 10 minutes with 20 seeds per run in 20 mL of water saturated with argon using a 2 inch tip (Part No. 630-0457, Sonics and Materials, Inc.) on the sonicator probe. The control seeds were soaked for 10 minutes in water saturated with argon. The results are presented in Table 2.

TABLE 2

| | SONICATED | CONTROL |
| --- | --- | --- |
| Colonies per plate | 0 | 4 |
| | 0 | 8 |
| | 0 | 16 |
| | 1 | 2 |
| | 2 | 8 |
| | 0 | 6 |
| | 1 | 10 |
| | 0 | 4 |
| | 1 | 12 |
| | 0 | 10 |
| Mean | 0.5 | 8.0 |
| Standard Deviation | 0.7 | 4.2 |

Although the invention has been described with respect to a preferred embodiment thereof, it is to be also understood that it is not to be so limited since changes and modifications can be made therein which are the full intended scope of this invention as defined by the appended claims.

We claim:

1. A method of clearing fungal spores from seed, comprising the steps of:

a) immersing said seed in a liquid that includes a dissolved gas wherein the dissolved gas is selected from the group consisting of helium, neon, argon, krypton, xenon and radon;

b) introducing into said liquid solution sound energy at a frequency and energy density sufficient to create cavitation in said liquid; and c) sonicating said seed solution at atmospheric pressure for between about 0.1 minute and about 15 minutes said period of time sufficient to result in clearing of fungal spores from said seed.

2. A method of clearing fungal spores from seed, comprising the steps of:

(a) immersing said seed in a solution including water and one or more gases selected from the group consisting of helium, neon, argon, krypton, xenon and radon;

(b) introducing sound energy into said solution at a frequency of between about 15 kHz and about 30 kHz and at an energy density of between about 1 watt/cm$^2$ and about 10 watts/cm$^2$; and (c) sonicating said seed for between about 0.1 minute and about 15 minutes.

3. A method as defined in claim 2, wherein:

(a) said seed is corn seed;

(b) said frequency is between about 17 kHz and about 25 kHz, said energy density of between about 1 watts/cm$^2$ and about 10 watts/cm$^2$; and (c) said corn seed is sonicated from between about 0.1 minute and about 15 minutes.

4. A method of clearing fungal spores from seed, comprising the steps of:

a) immersing said seed in a liquid that includes a dissolved gas wherein the dissolved gas is selected from the group consisting of helium, neon, argon, krypton, xenon, and radon;

b) introducing into said liquid solution sound energy at a frequency of between about 40 kHz and about 100 kHz and energy density sufficient to create cavitation in said liquid; and c) sonicating said seed solution at an atmosphere pressure for a time sufficient to result in clearing of fungal spores from said seed.

* * * * *

UNITED STATES PATENT AND TRADEMARK OFFICE
CERTIFICATE OF CORRECTION

PATENT NO. : 6,185,865 B1
DATED : February 13, 2001
INVENTOR(S) : Soll et al.

Page 1 of 1

It is certified that error appears in the above-identified patent and that said Letters Patent is hereby corrected as shown below:

<u>Title page</u>,
Item [75], add inventor -- Donovan P. Gibson --.

Signed and Sealed this

Twenty-third Day of October, 2001

Attest:

*Nicholas P. Godici*

NICHOLAS P. GODICI
*Attesting Officer*      *Acting Director of the United States Patent and Trademark Office*